United States Patent [19]

Sivanesan et al.

[11] 4,368,409

[45] Jan. 11, 1983

[54] SWITCHING REGULATOR POWER SUPPLY DEVICE COMBINED WITH THE HORIZONTAL DEFLECTION CIRCUIT OF A TELEVISION RECEIVER WHICH IT SUPPLIES

[75] Inventors: Appukuddy Sivanesan; Erich Geiger; Gerard Rilly, all of Paris, France

[73] Assignee: Thomson-Brandt, Paris, France

[21] Appl. No.: 272,267

[22] Filed: Jun. 10, 1981

[30] Foreign Application Priority Data

Jun. 10, 1980 [FR] France .................................. 80 12862

[51] Int. Cl.³ ............................................. H01J 29/70
[52] U.S. Cl. ..................................... 315/411; 358/190
[58] Field of Search ................. 315/408, 411; 358/190

[56] References Cited

U.S. PATENT DOCUMENTS 4,104,567 8/1978 Peer et al. ............................ 358/190

Primary Examiner—Theodore M. Blum
Attorney, Agent, or Firm—Oblon, Fisher, Spivak, McClelland & Maier

[57] ABSTRACT

Step-up switching regulator power supply device comprising, connected between the poles of a rectifier circuit supplied by an isolating voltage step-down transformer and loaded by a first filter capacitor, and inductance and the collector-emitter path of a first switching transistor of NPN type, a first diode whose anode is connected to the junction of the inductance and to the collector of said transistor and whose cathode is connected to a second filter and storage capacitor supplying a voltage at its output which supplies a horizontal deflection circuit of a television receiver.

This horizontal deflection circuit which comprises in cascade a horizontal oscillator, a driver stage and an output stage, forms an integral part of the circuit controlling said first transistor and determines the repetition period of the switching, because it is started under an initial voltage slightly less than the unregulated input voltage of the device.

The switching transistor is being turned off in synchronism with the turning off of the trace switch transistor by using flyback pulses of negative polarity to bias the base thereof.

9 Claims, 12 Drawing Figures

SWITCHING REGULATOR POWER SUPPLY DEVICE COMBINED WITH THE HORIZONTAL DEFLECTION CIRCUIT OF A TELEVISION RECEIVER WHICH IT SUPPLIES

BACKGROUND OF THE INVENTION

The present invention relates to a switching voltage regulator power supply device combined with the horizontal deflection circuit of a television receiver which it supplies with DC voltage. It relates, more particularly, to DC voltage supply devices of the type which boost or increase the voltage supplied at the output of the device in relation to the level of a DC voltage applied to its input and which regulate this level by recurrent switching of this input voltage, this switching being synchronous with the (horizontal) line frequency of the television receiver supplied by this device.

Switched step-up or boost voltage regulator devices of this type are known, particularly from the publications U.S. Pat. Nos. 3,571,697 (or 3,736,496) and they are related to switched mode power supply devices or DC-DC converters of the so-called unisolated flyback type, in which the collector-emitter path of a bipolar switching transistor is connected in series with a commutating inductance between the terminals of a DC source supplying an input voltage and a rectifying diode is connected between the junction of the inductance with the transistor and one of the plates of a filtering or storage capacitor (in parallel with the load), so that the current stored in the inductance during the conducting period of the transistor is used for charging the capacitor (and supplying the load) through the diode during its consecutive cut-off period. The use of a switched-mode power supply device of this type in television receivers for supplying, particularly, the horizontal deflection circuit thereof has been described, for example, in two articles by VAN SCHAIK entitled respectively "AN INTRODUCTION TO SWITCHED-MODE POWER SUPPLIES IN TV RECEIVERS" and "CONTROL CIRCUITS FOR SMPS IN TV RECEIVERS," appearing respectively on pages 93 to 108 of No. 3, Vol. 34, of September 1976 and on pages 162 to 180 of No. 4 of this same volume, of December 1976, in the English language Dutch review "ELECTRONIC APPLICATIONS BULLETIN" of PHILIPS', or on pages 181 to 195 of No. 135 of July 1977 and on pages 210 to 226 of No. 136 of October 1977 of the British review "MULLARD TECHNICAL COMMUNICATIONS." Since none of the switched-mode power supply devices described in these articles, isolated or not from the mains, whether they use a forward or a flyback converter, supplies at its output a DC voltage for supplying the horizontal deflection circuit before the switching transistor has been turned on (saturated or conducting) one or more times, the control circuit of this transistor must comprise an independent relaxation oscillator and must be supplied by the same DC input voltage (rectified and smoothed voltage of the AC mains) as the switching circuit comprising the inductance and the transistor in series. Synchronization of the switching with the horizontal deflection can only occur subsequently, when the horizontal oscillator and/or the horizontal deflection circuit as a whole have begun to operate, as soon as the supply voltage supplied thereto by the device which operates independently on starting up, has become sufficient. This synchronization of the switching with the horizontal deflection, advantageous for reducing or eliminating the interferences visible on the screen which are caused by high-frequency energy radiation due to abrupt transitions of power switching, particularly when the switching transistor is being cutt off, is generally carried out by means of a signal comprising flyback or retrace pulses, taken at the terminals of an auxiliary secondary winding of the line tranformer whose primary winding is generally connected between the output of the switched-mode power supply device and one of the terminals of the trace switch which is provided in the output stage. It is also possible to use for this purpose the signal provided by the horizontal oscillator (see, for example, the publication FR-A-2 040 217).

In a switched-mode supply for a television receiver described in the publication FR-A-2 261 670, the circuit for controlling the switching transistor of a forward-type converter, supplied with the rectified and smoothed voltage of the mains, comprises a bistable trigger circuit of flip-flop one of whose outputs is coupled back to one of its trigger inputs through a regulating circuit comprising a sawtooth voltage generator and a voltage comparator providing transitions which control the setting of the flip-flop, when the sawtooth voltage reaches the level of a voltage proportional to the amplitude of the flyback pulse. The other one of the two complementary outputs of this flip-flop is coupled back to its other trigger input through a so-called starting loop comprising an ascending voltage wave-form which approaches asymptotically a predetermined voltage level smaller than a predetermined fraction of the nominal level which the amplitude of the flyback pulse must reach in normal operation, and a voltage comparator providing transitions which control the recurrent resetting of the flip-flop to its initial state until the flyback pulse has reached or exceeded a threshold amplitude slightly below its nominal amplitude. When this threshold amplitude has been exceeded, resetting of the flip-flop is controlled by the flyback pulses themselves, negative-going in the present case, which supplant the starting pulses. Such an arrangement is equivalent to an astable multivibrator during the starting period, which later becomes a monostable one and triggered by the flyback pulses and whose quasi-stable state has a variable duration, depending on the amplitude of these pulses so as to obtain regulation thereof by the duty cycle. The pulse which controls the closing of the switch (saturation of the switching transistor) begins here with the leading edge of the flyback pulse and its duration or length is modulated as a function of the current drawn by the load and of the variation of the rectified and smoothed voltage, so that its end controlling the opening of the supply switch (cutting off the transistor) occurs during the trace portion of the horizontal deflection. Thus it can be seen that this switched-mode supply, like most of the known ones, effects regulation of its output voltage by varying the duty cycle as a reverse function of the level thereof.

Since the high-frequency radiation is precisely at its most intense during abrupt transitions of current in the switching inductance and of the voltage accross its terminals, the appearance of one or more vertical lines (light or dark according to the sense of the modulation of the carrier wave by the video signal) may be observed, contrasting with the normal contents of the picture, whose location on the screen depends on the duration of the pulse controlling the switching transistor. The effect of this radiation becomes particularly troublesome when the input signal of the radio-frequency stages or tuner is small, particularly when the selected channel is situated in the lower part of the VHF band, for the automatic gain-control device of the receiver acts on the gain of the high-frequency and/or intermediate-frequency input stages, so that the sensitivity (amplification) of the receiver is then maximum and this also as concerns the spurious radiated signals.

SUMMARY OF THE INVENTION

The present invention, on the one hand, avoids or at least appreciably reduces the interferences visible on the screen by controlling the cutting off of the switching transistor in synchronism with the leading edge or the flyback pulse and, on the other hand, the starting of the horizontal deflection circuit by means of a simple circuit without any special oscillator, and provides efficient protection of the switching transistor which remains cut off when the horizontal deflection circuit is not operating. This is made possible by using a step-up switching regulator supply device of the type described in the publication U.S. Pat. No. 3,571,697 and whose control circuit includes, in accordance with the invention, the horizontal deflection circuit, which it supplies.

The object of the present invention is a power supply device with boosting and regulation of its output voltage by switching, combined with a horizontal sweep circuit of a television receiver, which it supplies and which comprises a horizontal oscillator, a driver stage and an output stage including a line transformer, this device comprising an inductance and the collector-emitter path of a switching transistor connected in series between the poles of a DC input voltage source, a rectifiying diode connected by its anode to the junction between the inductance and the collector of the transistor and by its cathode to one of the terminals of a filtering capacitor whose other terminal is connected to the emitter of the transistor so as to supply between its terminals an initial output voltage, slightly lower than the input voltage, when the transistor is cut off permanently, and a regulated DC output voltage with a level higher than the input voltage, when the transistor is recurrently alternately turned on and off, the level of this output voltage depending on the duty cycle of the respective states of this transistor, and a control circuit for driving the base of the transistor and including a regulator stage comparing an adjustable fraction of the output voltage to a fixed reference voltage and supplying a regulating current or voltage proportional to the difference between these compared voltages, to a pulse-width modulator triggered by means a recurrent signal and supplying a rectangular signal whose duty cycle varies as a function of this regulating current or voltage, and another driver stage receiving the rectangular signal and controlling the switching transistor.

In accordance with the invention, the horizontal deflection forming an integral part of the circuit controlling the switching transistor, determines therefor, from the start, the repetition period of the rectangular signal controlling it, and one of the supply inputs of the other driver stage receives directly a first voltage waveform whose positive alternations, comprise DC voltage plateaux and whose negative alternations comprise negative-going flyback pulses supplied by a first secondary winding of the line transformer, so as to control the cut-off the switching transistor substantially simultaneously with that of the trace switch transistor.

DESCRIPTION OF THE DRAWINGS

The invention will be better understood and other of its objects, characteristics, features and advantages will become clear from the following description and the accompanying drawings which refer thereto, given solely by way of example, in which.

DESCRIPTION OF THE PREFERRED EMBODIMENTS

Figure 1:
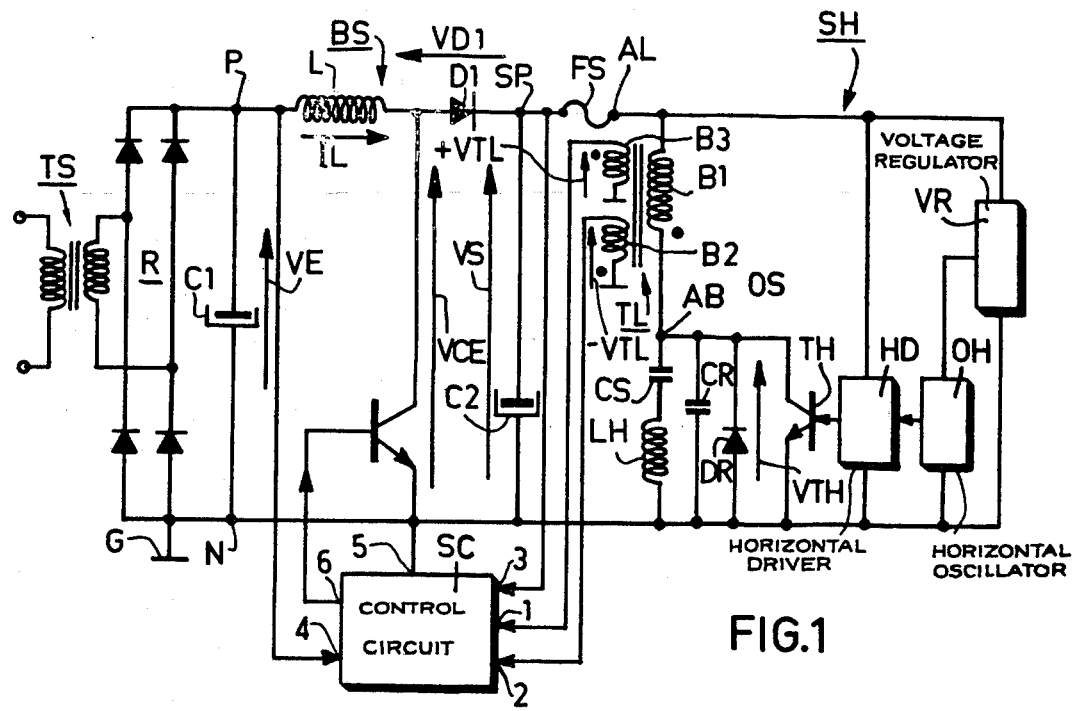
FIG. 1 is partly a block diagram and partly a schematic diagram of a power supply device combined with the horizontal deflection circuit in accordance with the invention.

FIG. 1 shows the schematic diagram of the power stages of the power supply device and of the horizontal deflection circuit of the television receiver, which it supplies and in block diagram form the respective circuits which control them.

The DC input voltage VE which is not regulated is supplied by a rectifier bridge R with four diodes, supplied at its input by the secondary winding of an insulating step-down transformer TS, whose primary winding is supplied by the AC mains. The output terminals of rectifier bridge R are connected respectively to the terminals of a first filtering capacitor C1 across which this input voltage VE is taken.

The positive pole P of this source of the input voltage VE is connected to one of the terminals of an energy-storage inductance L, whereas its negative pole N is connected to ground G of the receiver, which is isolated from the mains. The other terminal of inductance L is connected, on the one hand, to the collector of a first NPN bipolar switching transistor T1, whose emitter is connected to ground G and, on the other hand, to the anode of a first diode D1 whose cathode is connected to the positive terminal of a second filtering and storage capacitor C2. With the negative terminal of this second capacitor C2 connected to ground G, the output voltage VS which supplies the load is taken between its terminals.

Such a supply device BS provides both step-up or boost and regulation of its output voltage level, because the first switching transistor T1 and the first diode D1 thereof are connected so as to conduct respectively currents flowing through inductance L in the same direction, it supplies at its output formed by the terminals of the second capacitor C2, an initial DC voltage VSI as soon as the primary winding of the insulating transformer TS is connected to the mains. This initial voltage VSI which is equal to the input voltage VE less the forward voltage drop VD1 across the first diode D1, is then supplied to the load until the control circuit SC is started up, whose output 6 is connected to the base of the first transistor T1 so as to cause it to be alternately turned on and off.

When the first transistor T1 is turned on by positively biasing its base-emitter junction, its collector-emitter path connects the junction of the inductance L with the anode of the first diode D1 to ground G. Diode D1 being then reversely biased, it ceases to conduct and the inductance L connected by the first transistor T1 between the positive P and negative N poles of the source supplying the unregulated DC input voltage VE, then conducts a linearly increasing current IL so as to store the energy which increases with the square of the conduction duration of the first transistor T1, until this latter is cut off. At the instant when the first transistor T1 is cut off after the control circuit SC has brought its base-emitter voltage to zero or below, the voltage at the terminals of inductance L is reversed so that, at its junction with the collector of transistor T1 and the anode of diode D1, there appears a voltage VM greater than the input voltage VE, which results in the forward biasing of diode D1. Consequently, from the instant when transistor T1 is cut off, diode D1 conducts a linearly decreasing current until the energy stored in the form of a current IL in the inductance L, which charges the second capacitor C2 to an output voltage VS greater than the input voltage VE, disappears. The regulation of the level of the output voltage VS is here effected in a conventional way, by varying the duty cycle, i.e. the radio (quotient) between the duration of the conducting period of transistor T1 and the sum of the respective durations of two of its successive conducting and cut off periods, as a function of the desired output voltage VS (determined by comparison to a stable reference voltage).

According to the invention, a supply device BS of the above-described type is combined with the horizontal deflection circuit SH of a television receiver, which it supplies, so that this latter forms an integral part of its control circuit SC and for determining the repetition period of its operation and so that the above-mentioned regulation by varying the duty cycle maintains a stable peak-to-peak amplitude of the sawtooth scanning current and/or the very high voltage for biasing the electrodes (anode, focusing electrode and accelerating grid) of the cathode-ray tube, which are obtained by rectifying the horizontal flyback pulses supplied by a step-up secondary winding (not shown) of the line transformer TL.

The horizontal deflection circuit SH which comprises in cascade the horizontal oscillator OH whose known phase control circuit with respect to the horizontal sync signal separated from the composite video signal has not been shown here, the driver stage HD controlled by the horizontal oscillator OH and controlling the output stage OS of the horizontal deflection, is as a whole supplied by the above-described regulated power supply device BS. In fact, the positive supply input AL of the horizontal deflection circuit SH is connected by means of a fuse FS to the junction of the cathode of the first diode D1 with the positive terminal of the second capacitor C2, which forms the positive output terminal SP of the regulated power supply device BS. This supply input AL is connected directly to that of the driver circuit HD and, preferably, through a conventional Zener diode or series ballast transistor voltage regulator VR, to that of the horizontal oscillator OH, which are moreover connected to the isolated ground G.

The supply input AL of the horizontal deflection circuit SH is furthermore connected to one of the primary winding terminals B1 of the line transformer TL, whose other terminal AB is connected in parallel to the collector of another switching transistor TH, of NPN type, called trace switch transistor, to the cathode of a second so-called shunt recovery diode DR, to one of the terminals of another capacitor CR, called line-retrace capacitor, and to one of the plates of an additional capacitor CS, called trace capacitor, which supplies the horizontal deflection coils LH one terminal of which is connected to its other terminal during the trace periods of the scanning. The emitter of the scanning transistor TH, the anode of the "shunt" recovery diode DR, the other terminal of the retrace capacitor CR and the other terminal of the horizontal deflection coils LH are all connected to ground G. This assembly of components thus connected forms the output stage OS whose operation is well-known and does not form part of the invention.

As was mentioned above, as soon as the primary winding of the step-down isolating transformer TS is connected to the mains, rectifier R supplies the first filtering capacitor C1 so as to provide between its terminals P and N a unregulated low DC voltage VE. With the first transistor T1 then turned off, this input voltage is applied through the inductance L and the first diode D1 to the second capacitor C2 so as to obtain between the terminal SP and ground G an initial output voltage VSI substantially equal to VE−VD1, which is approximately equal to 60 percent of the regulated output voltage VS. This initial output voltage VSI (equal to about 0.6 VS) is sufficient to cause the generation of autonomous oscillations by the horizontal oscillator OH. This latter supplies at its output, connected to the input of driver circuit HD, pulses at an independent frequency close to the line frequency. In response to these pulses, driver circuit HD, also supplied by device BS, provides at the base of the trace switch transistor TH pulses controlling its periodical cut off at this independent frequency and its consecutive turning on after a period greater than the duration of the flyback period, so that the recovery diode DR may take the current from the deflector LH during substantially the first half of the trace portion of the scan. During flyback or retrace, with both transistor TH and diode DR cut off, the energy stored in the form of currents respectively in the inductances of deflector LH and of the primary winding B1 of the line transformer TL which are then, from the AC current point of view, connected in parallel, flow in an oscillating manner through the retrace capacitor CR which forms therewith a parallel resonant circuit whose resonance period determines the duration of the flyback period.

Figure 2:
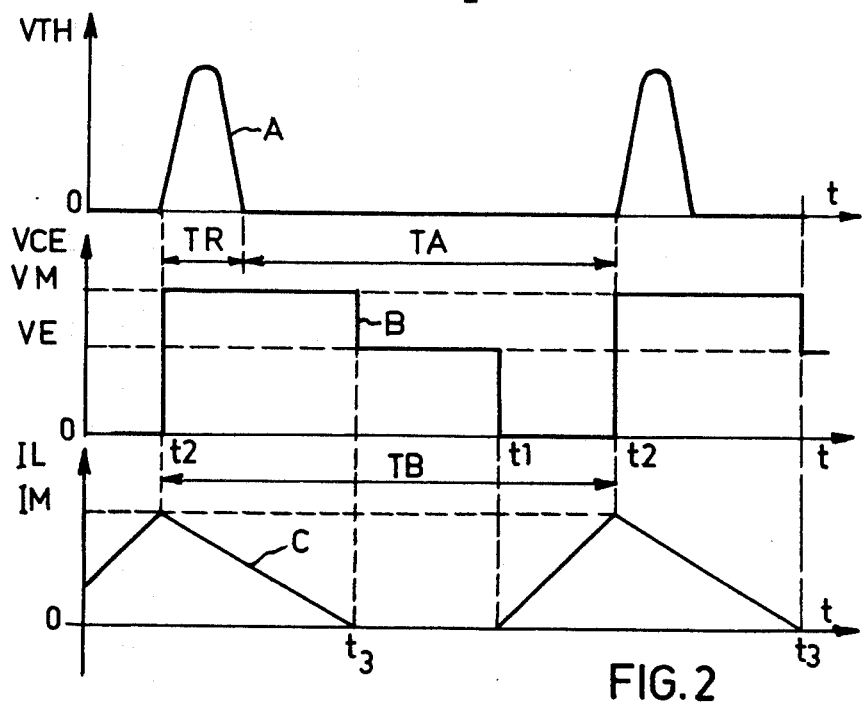
FIG. 2 shows waveforms of two voltages and of a current at different points of the circuit of FIG. 1.

There then appears periodically between point AB and ground G a voltage pulse VTH having substantially a sinusoidal half-wave form, which is shown in Diagram A of FIG. 2. The average value of this voltage VTH being then equal to VSI, at start-up, and to VS, during established operation. The line transformer TL comprises, in addition to a very-high-voltage winding and other windings for supplying rectifying circuits, not shown, two secondary windings B2, B3 respectively supplying across their terminals, voltage waveforms comprising flyback pulses with zero average values and with respectively negative and positive polarities.

This means that the first secondary winding B2 supplies a voltage waveform −VTL which, between two successive flyback pulses, comprises a positive plateau whose level is equal to the average value of these pulses and which is used, in accordance with the invention, to control the turn off of the first transistor T1 so that the interferences which would otherwise be visible only occur during the line-blanking periods comprising the line-retrace periods. The second secondary winding B3 then supplies a voltage waveform +VTL which is the reverse of or complementary to the preceding one −VTL.

One of the terminals of each of these secondary windings B2, B3 is connected to ground G, whereas their other terminals are respectively connected to two inputs 2 and 1 of the control circuit SC. A third input 3 of this latter is connected to the SP output of the supply device BS and a fourth input 4 is connected to the positive pole P of the input voltage source VE. A fifth terminal 5 of the control circuit SC is connected to ground G (or negative pole N) and its output 6 is connected to the base of the first transistor T1. This control circuit SC causes, following the start up of the horizontal deflection circuit SH, a first saturation of the first transistor T1 at a time determined by a pulse-width modulator operating by conventional comparison of a sawtooth voltage waveform the elaboration of which is controlled by a first flyback pulse, with a regulating voltage, depending on the output voltage VS. During this saturation period of transistor T1 which extends as far as the leading edge of the next flyback pulse, energy is stored in inductance L.

From the instant when transistor T1 is turned off, diode D1 transfers this stored energy to the second capacitor C2, at the terminals of which it causes an increase of the voltage VS with respect to its initial value VSI, until the current in diode D1 is canceled out, when it becomes reverse biased.

The collector-emitter voltage waveforms VTH of the trace switch transistor TH and VCE of the switching transistor T1 in established operation have been shown respectively by the diagrams A and B of FIG. 2. Diagram C of FIG. 2 shows the corresponding waveform of the current IL flowing through the inductance L.

When the base of the first transistor T1 receives from the output 6 of the control circuit SC a rectangular signal which turns it on at time instant t1, its collector-emitter voltage VCE (Diagram B) becomes close to zero ($V_{CEsat}$) and a linearly increasing current IL (Diagram C) flows through inductance L from time t1 until time t2 when transistor T1 is again turned off, which is controlled by the leading edge of the flyback pulse VTH (Diagram A). With the collector current of transistor T1 canceled at the end of the storage time of the excess minority carriers in the base, the voltage across the terminals of the inductance L inverses its polarity so as to be added to the input voltage VE, so that the collector-emitter voltage VCE (Diagram B) then reaches a level VM greater than VS (as well as VE), so as to apply forward bias to the first diode D1, which then conducts the current IL through the inductance L. This current IL, from time instant t2 when it reaches its maximum value IM, becomes linearly decreasing and it flows through the first diode D1 in the passing direction in order to recharge the second capacitor C2 and supply, in particular, the horizontal deflection circuit SH.

When the current IL passing through the first diode D1 is canceled out at time t3, the collector-emitter voltage VCE of the first transistor T1 becomes equal to the unregulated input voltage VE until the next turn on of the transistor T1, and the first diode D1 remains reversely biased until the time when this latter is cut off again.

From the above it can be easily seen that the principal advantage of this combined device resides in the fact that a single oscillator OH belonging to the horizontal deflection circuit SH is sufficient for controlling the two power switching transistors TH and T1.

Furthermore, a possible overload in the circuitry of the television receiver, such for example as a short-circuit of the trace switch transistor TH, results in overloading the diode D and the inductance L. The first transistor T1 which is consequently cut off is not subjected to this overload and is therefore protected. In order to protect the rest of the television receiver as well as inductance L and the first diode D1, a fuse FS may be connected in series in the supply line from the second capacitor C2. This fuse FS may also be inserted between pole P and inductance L.

It is moreover known that it is difficult to construct switched supplies for obtaining correct operation when it is not fully charged (for supplying, for example, a ready-state remote-control receiver). In the present case, the problem does not come up since, when the supply is in operation, there is always a minimum load formed by the horizontal deflection circuit. When this circuit is not operating, the supply circuit BS does not operate either, but it supplies an output voltage VSI of a value less than the nominal voltage VS which cannot cause damage and which may, for example, supply a ready-state receiver for television receivers having a remote control.

Finally, the control circuit SC allows transistor T1 to be cut off at the beginning of each flyback period, when the blanking circuit has extinguished the spot (s) on the cathode-ray tube. Thus, the spurious signals radiated into the receiver input circuits will cause no visible effect on the screen of the cathode-ray tube.

Figure 3:
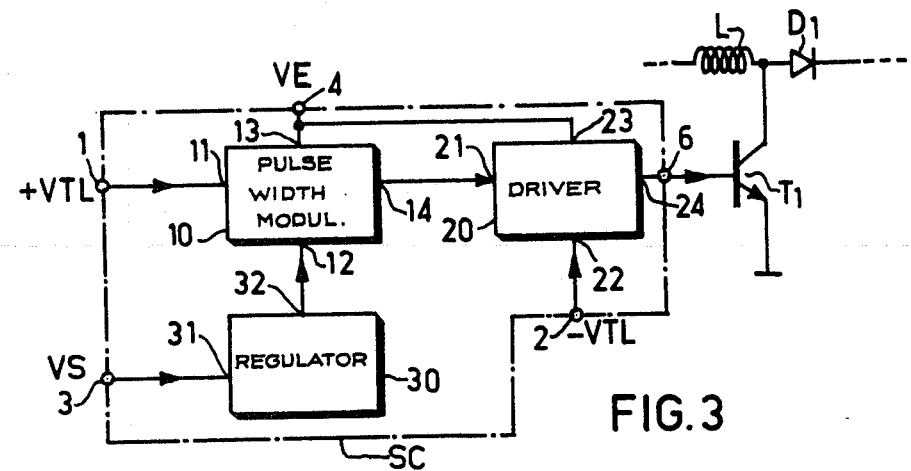
FIG. 3 is a block diagram of the circuit for controlling the switching transistor.

FIG. 3 shows in block diagram form the control circuit SC of FIG. 1.

This control circuit SC comprises a pulse-width modulator stage 10 a first input 11 of which, connected to input 1, receives flyback pulses of positive polarity +VTL from the second secondary winding B3 of the line transformer TL (see FIG. 1 and a second input 12 of which receives a so-called regulating voltage or current whose level is proportional to the difference between the actual output voltage VS and a constant reference value, delivered by the output 32 of a regulating circuit or stage 30 whose input 31 is connected through input 3 to the positive output pole SP of the supply device BS supplying the regulated voltage VS. The variation of the regulating current or voltage causes the variation of the time instant when the instantaneous amplitude of a sawtooth voltage waveform, either with substantially constant slope and amplitude, reaches the level of this regulating voltage, or with a slope variable depending of the regulating current (which is added to the current for linearly charging a capacitor), reaches the predetermined level of a fixed reference (threshold) voltage, with respect to the beginning or the end of the sawtooth waveform. Thus a two-level rectangular signal with constant periodicity is generated, whose duty cycle varies as a function of the regulating current or voltage. If it is arranged, which is possible, for a reduction of the output voltage VS with respect to its nominal value defined by the reference voltage, to cause an increase in the duty cycle and for an increase in VS to have the opposite effect, regulation of this output voltage VS is provided, which tends to be stabilized to this nominal value.

The output 14 of modulator 10 supplies a first input 21 of the driver stage 20 of the first switching transistor T1, a second input 22 of which receives the flyback pulses of negative polarity −VTL, coming from the first secondary winding B2 of the line transformer TL.

Figure 4:
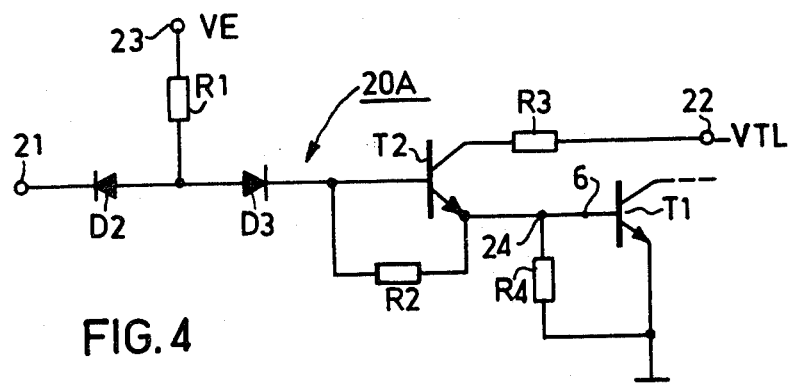
FIGS. 4 and 5 are schematic diagrams of two different embodiments of the driver circuit 20 forming the output stage of the control circuit of FIG. 3.
Figure 5:
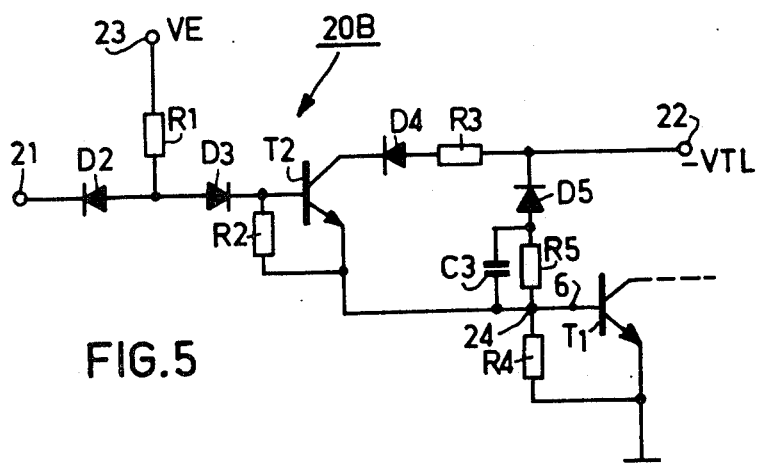

FIGS. 4 and 5 illustrate two different embodiments of the driver stage 20 of FIG. 3, providing efficient turn off of the first transistor T1.

In FIG. 4, the driver stage 20A comprises a third supply input 23 which connected to the positive pole (P) of the source of the (unregulated) input voltage VE and to one of the terminals of a first resistor R1 (1.8 kiloohms) whose other terminal is connected in parallel to the anodes of two diodes D2 and D3 (of type 1N4148). The second of these diodes D3 has its cathode connected to the base of a third NPN transistor T2 and to one of the terminals of a second resistor R2 (220 ohms). The emitter of the third transistor T2 is connected to the other terminal of the second resistor R2 and to the output 24 of stage 20A, which is connected through the output 6 of the control circuit SC to the base of the first transistor T1. The collector of the second transistor T2 is connected through a third resistor R3 (10 ohms) to the second input 22 of stage 20A receiving the signal −VTL which comprises the negative-going flyback pulses and, between them, plateaux of a constant positive level (zero average value). The base of the first transistor T1 is coupled to its emitter and to ground G, through a fourth resistor R4 (100 ohms). The third transistor T2 is thus mounted as a common collector (emitter-follower) stage.

When the output 14 of modulator 10 (FIG. 3) which is connected to the input 21 of stage 20A supplies a low state (level), i.e. a voltage close to zero, the thus positively biased diode D2 becomes conducting so that its anode will be at a voltage of a few tenths of a volt $(0.7+V_{CEsat})$ which is less than the voltage required for making the three series PN junctions orientated in the same direction conductive, the first of which is formed by the third diode D3, the second is the base-emitter junction of a third transistor T2 and the third that of the first transistor T1, which will thus remain turned off. When, on the other hand, output 14 supplies a high state or forms an open circuit (the output stage of modulator 10 being formed by an open-collector transistor), diode D2 is cut off by its reverse bias and the voltage VE applied to the input 23 causes a current to flow through the first resistor R1, the diode D3 and the respective base-emitter junctions of transistors T2 and T1 connected in series. Under these circumstances and if, at the same time, the voltage waveform −VTL applied to the collector of transistor T3 presents its constant positive level portion, coinciding with the trace periods of the horizontal scan, transistors T2 and T1 become simultaneously saturated with the effect previously described insofar as the supply device BS of FIG. 1 is concerned. On the other hand, when the voltage waveform −VTL applied to the collector of the third transistor T2 becomes negative, during flyback periods, the current then flows between terminals 23 and 22 of driver stage 20 A, through resistor R1, diode D3, the base-collector junction of the third transistor T2 and resistor R3. The third transistor T2 then operates along its symmetrical saturation characteristics, i.e. it is inverted so that its collector becomes emitter and vice versa. It then conducts a current in the reverse direction between ground and the input 22 (negative) through the resistor R4 across the terminals of which it causes, after removal of the excess minority carriers from the base of the first transistor T1 through the third transistor T2, a voltage drop biasing said base negatively with respect to the emitter. This negative voltage applied to the base of reversely saturated transistor T3 allows a considerable reduction in the storage time and a rapid turnoff of the first transistor T1. Since the sawtooth generator of the pulse-width modulator 10 described above is controlled by positive-going flyback pulses, the rectangular signal applied by its output 14 (FIG. 14) to input 21 of stage 20A undergoes, during the flyback period following the turn off of the first transistor T1, a transition from its high state to its low state which causes diode D2 to conduct and, consequently, the third transistor T2 (reversed) to be cut off before the waveform −VTL becomes positive again and rebiases this transistor T2 the right way round.

FIG. 5 shows the schematic diagram of another embodiment of the driver circuit 20 of FIG. 3, designated by 20B, which has only been modified with respect to circuit 20A of FIG. 4 insofar as the collector circuit of the third transistor T2 and the base circuit of the first transistor T1 are concerned.

This modification is more particularly intented for the case where the negative peak amplitude of the voltage waveform −VTL applied to the base of the first transistor T1 through resistor R3 and the emitter-collector path of the reversely saturated third transistor T2, exceeds the reverse (Zener) avalanche-effect breakdown voltage of one of the base-emitter or base-collector junctions of the first transistor T1. This may occur when the first secondary winding B2 of the line transformer TL is also used for other functions in the television receiver.

To prevent the third transistor T2 from being reversely saturated (symmetrically), the circuit 20B comprises a fourth diode D4 inserted between the input 22 receiving the voltage waveform −VTL and the collector thereof, in series with the resistor R3 and connected to conduct in the same direction as its collector-emitter path. The input 22 is more over connected to the cathode of a fifth diode D5 (1N4148) whose anode is connected through a circuit formed by a fifth resistor R5 (330 ohms) and a third capacitor C3 (1nF) connected in parallel, to the base of the first transistor T1.

Diode D5 isolates the base of transistor T1 from the input 22, when the waveform −VTL is positive, and connects them together through a resistive voltage divider formed by resistors R5 and R4 in series, when it becomes negative. Capacitor C3 accelerates the turn-off by favoring the transmission to the base of T1 of abrupt transitions of the negative flybacd pulses.

Figure 6:
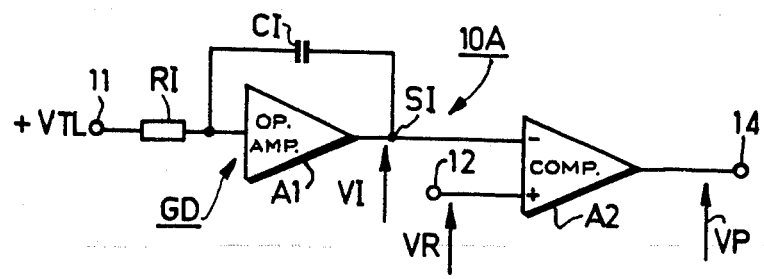
FIG. 6 is the block diagram of one embodiment of the pulse-width modulator 10 of the circuit of FIG. 3.

FIG. 6 is a diagram, partly in block form, of a possible embodiment of the pulse-width modulator 10 of the control circuit SC of FIG. 3. Diagrams D, E and F of FIG. 7 show the voltage waveforms applied respectively to the input 11 (+VTL) and supplied by the output SI (VI) of the sawtooth generator GD and by the output 14 (VP) of circuit 10A.

Figure 7:
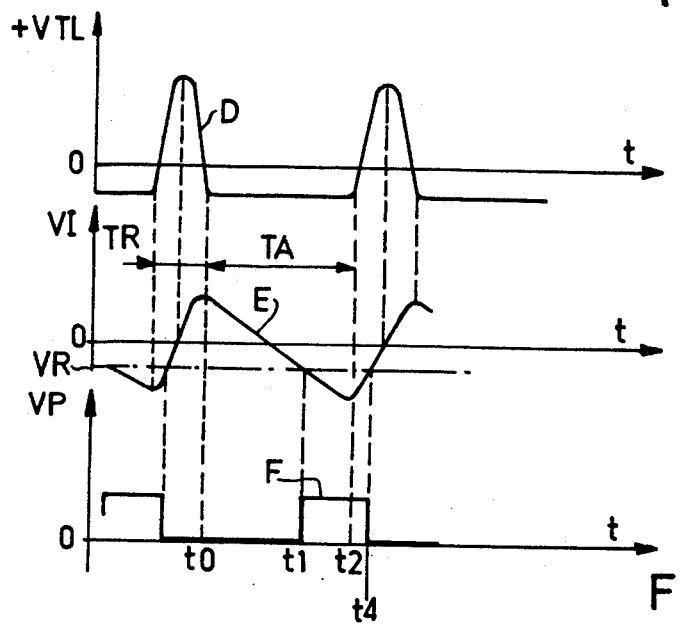
FIG. 7 shows three voltage waveforms at different points of the circuit of FIG. 6.

Modulator 10A of FIG. 5 comprises a sawtooth generator GD formed by a conventional integrator circuit comprising a first amplifier A1 (integrated operational amplifier, for example), an integrating resistor R1 inserted in series between the input 11 receiving the voltage waveform +VTL illustrated by Diagram D of FIG. 7 and supplied by the second secondary winding B3 of the line transformer TL, and the input (inverting) of amplifier A1, as well as an interating capacitor CI connected between this input and the output SI of amplifier A1 (capacitive feedback). In response to this waveform +VTL, the output of amplifier A1 forming the output SI of sawtooth generator GD, supplies a voltage waveform VI illustrated by the diagram E of FIG. 7 which comprises, during the period between time instants t0 and t2 corresponding to the trace period TA of the scan, a voltage decreasing linearly between a maximum value (positive) and a minimum value (negative), and during the flyback intervals preceding time instant t0 and succeding to time instant t2, an increasing voltage of substantially semi-cosinusoidal shape.

Voltage VI is applied to one of the inputs (−) of an analog voltage comparator which may be formed by means of a second differential-type amplifier A2 (integrated operational amplifier), whose other input (+) connected to the input 12 of modulator 10A, receives the regulating voltage VR supplied by the regulator stage (30 of FIG. 3). This regulating voltage VR, which is obtained by comparing the output voltage VS of the supply device BS of the circuit of FIG. 1 with a reference voltage (VZ supplied by a Zener diode, for example), is a DC voltage undergoing slow variations, shown in Diagram E of FIG. 7 by a dash-dot line.

When the waveform VI applied to the inverting input (−) of comparator A2 is greater than the regulating voltage VR, which is the case during the period between time instants t0 and t1, its output connected to the output 14 of modulator 10A provides a low state. When, on the other hand, it (VI) reaches or becomes less than VR, which occurs from the time instant t1, the output 14 of modulator 10A provides a high state (which causes saturation of the first transistor T1). This high state continues until time instant t4 subsequent to the time instant t2 of the beginning of the following flyback pulse whose leading edge controls the turn-off of the first transistor T1, when the waveform VI becomes greater than the regulating voltage VR. Thus there is obtained at the output 14 of modulator 10A a rectangular signal VP shown in Diagram F of FIG. 7, formed successively of a low-level (zero or negative) beginning during the first half of the flyback period TR and ending at time instant t1, and a high level going from time instant t1 to time instant t4. Time instant t1 of the positive transition of signal VP, which determines the beginning of conduction of the first transistor T1 is then situated during the trace period of the scan TA and its position with respect to the beginning t0 or to the end t2 thereof varies as a function of the regulating voltage VR. When the regulating voltage VR is negative (as on the Diagram E of FIG. 7), a predetermined fraction of the output voltage VS is greater than the reference voltage, the duration of the high level state (t2-t1) is less than half of the trace period of the scan T1. In the opposite case, this duration (t2-t1) is greater than TA/2. The modification of this duration (t2-t1) and thus of the duty cycle is carried out in the reverse direction of the variation of the output voltage VS so as to stabilize it at a previously adjusted level, with respect to this reference voltage. The waveform −VTL may also be applied to the input 11 of modulator 10A. In this case, the input of comparator A2 must also be inverted.

To obtain suitable operating limits, while taking into consideration particularly the value of inductance L, the duty cycle or the durations (t2-t1) must vary between 0, the case where the input voltage VE is equal to the nominal output voltage VS, and about two-thirds, the case where the maximum power is supplied for a minimum voltage at the input.

The ratio between the residual alternating voltage (hum) at the output and the alternating voltage at the input must also allow an image to be obtained which is not perturbed for the eye. A value less than or equal to a hundredth for this ratio gives satisfactory results.

Figure 8:
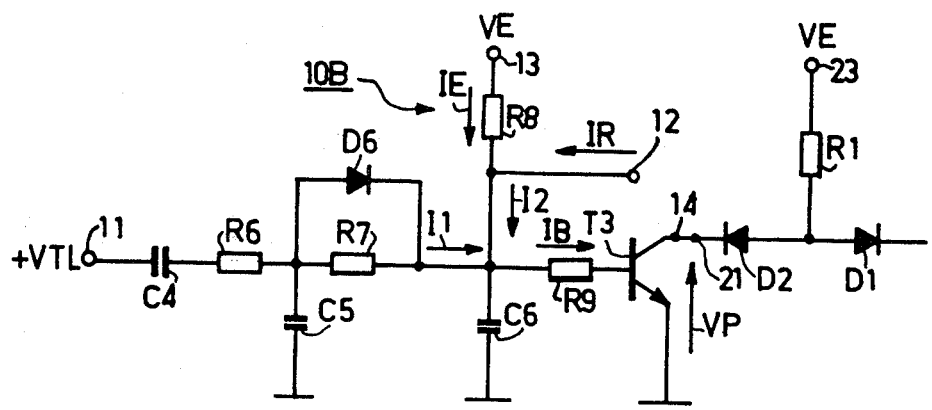
FIG. 8 is a schematic diagram of one embodiment of the pulse-width modulator 10 of the circuit of FIG. 3, using discrete components.

FIG. 8 shows the simplified diagram of a practical embodiment (by means of discrete components) of the pulse-width modulator 10 of FIG. 3. Different waveforms of a current I1 and input +VTL and output VP voltages are respectively illustrated by the Diagrams H, J and K of FIG. 9.

Figure 9:
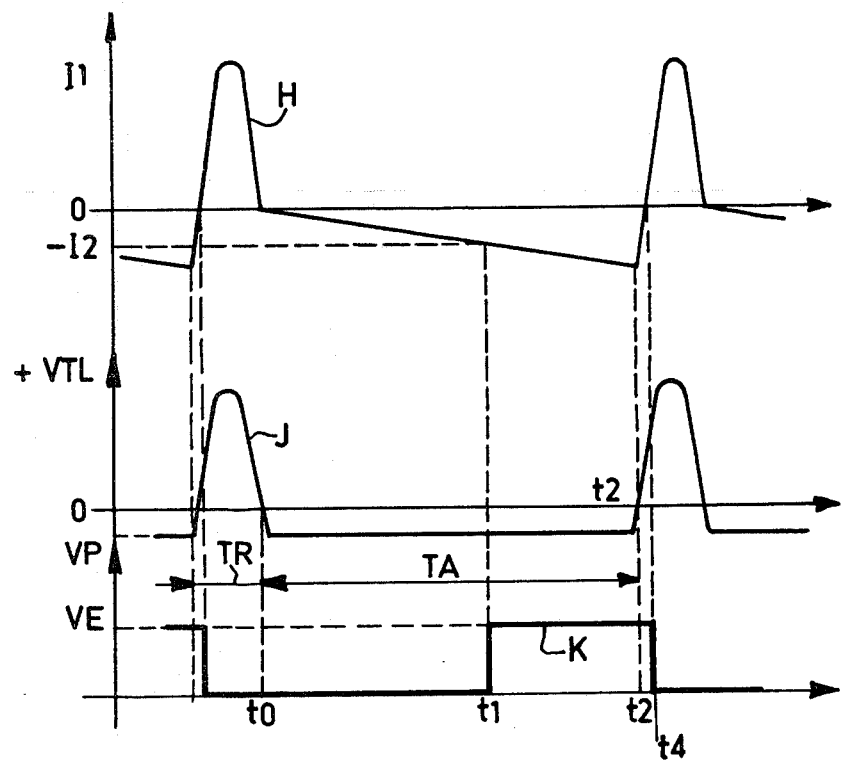
FIG. 9 shows a current waveform and two voltage waveforms at different points of the circuit of FIG. 8.

The input 11 of modulator 10B of FIG. 3 receives the voltage waveform +VTL which may be suppled either directly by the second secondary winding B3 of line transformer TL, or through a coupling capacitor whose one terminal is connected to the collector of the trace switch transistor TH (see FIG. 1). This input 11 supplies a passive shaping circuit, supplying negative-going (decreasing) sawtooth waveforms during the trace periods of scan T1. This passive circuit comprises a fourth coupling capacitor C4 (0.1µ) one terminal of which is connected to the input 11 and the other of which is connected to one of the terminals of a sixth resistor R6 (10 Kohms). The other terminal of this resistor R6 is connected to one of the terminals of a seventh resistor R7 (5.6 Kohms), to one of the terminals of a fifth capacitor C5 (5.6 nF) and to the anode of a sixth diode D6. The other terminal of capacitor C5 is connected to ground G. The cathode of the sixth diode D6 and the other terminal of resistor R7 are both connected to one of the terminals of an eighth resistor R8 (33 kohms), to that of a ninth resistor R9 (470 ohms), to that of a sixth capacitor C6 (4.7 nF) and to the regulation input 12 of modulator 10B, which is connected to the output 32 of the regulator stage 30 (see FIG. 3). The other terminal of capacitor C6 is connected to ground. The other terminal of resistor R8 is connected to the supply input 13 of modulator 10B receiving the input voltage VE. The other terminal of the ninth resistor R9 is connected to the base of a fourth NPN transistor T3, which forms the voltage comparator stage, whose emitter is connected to ground and whose collector (open), which forms the output 14 of modulator 10 B, is connected to the input 21 of the driver stage 20A (of FIG. 4) or 20B (of FIG. 5), formed by the cathode of the second diode D2. The value of capacitor C6 has been chosen so as to limit the maximum negative voltage applied to the base-emitter junction of transistor T3 to a value less than its reverse avalanche breakdown voltage. When the input voltage waveform +VTL is positive, as during the major portion of the flyback periods TR, diode D6 short-circuits resistor R7 and we have then a simple passive RC integrator formed by resistor R6 in series and two capacitors C5 and C6 in parallel, whose output is connected to the base of transistor T3 through resistor R9. Transistor T3 becomes conducting when its base current IB formed by the sum of currents I1 and I2 becomes positive. The current I1 shown by an arrow in FIG. 8 and on the Diagram H of FIG. 9, results from the application of the +VTL waveform of Diagram J to the above-mentionned simple integrator, during its positive alternation, and to the cascaded double integrator R6, C5, R7, C6 during its negative plateau going from t0 to t2. During this negative voltage plateau of the +VTL signal, the current I1 becomes negative and linearly decreasing. When the instantaneous negative amplitude of current I1 becomes equal to the positive current I2 shown by another arrow in FIG. 8 and by means of a reversed constant level (−I2) shown by a broken line in diagram H of FIG. 7, which occurs at time t1, the base current of transistor T3 is cancelled out and this latter is cut off. Since the current I2 is due for a large part to the regulating current IR supplied by the output of the regulator stage (30 in FIG. 3) and proportional to the error voltage, the duration of the cut-off state (t4−t1) of transistor T3 and, consequently, that (t2−t1) of the saturated state of the first transistor T1 (as well as the duty cycle) will vary reversely to the variation of this current IR. The current IE shown by an arrow in FIG. 8, which flows through the high-value resistor R8 from the input voltage source VE and which is one of the components with IR of current I2, forms a small current for maintaining transistor T3 saturated in the absence of flyback pulses and thus of horizontal deflection. The fact that resistor R8 is supplied by the unregulated input voltage VE allows another parameter to be added for acting on the duty cycle of transistor T3 as a function thereof. Diagram K of FIG. 9 illustrates the rectangular signal VP obtained at the output 14 of the modulator 10B of FIG. 8.

Figure 10:
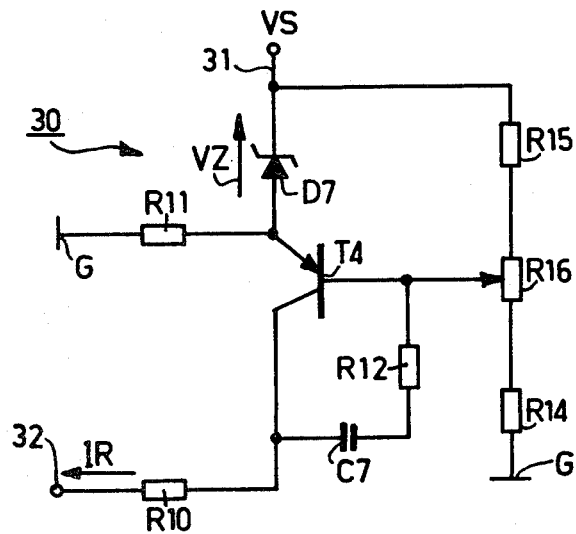
FIG. 10 is a schematic diagram of a conventional embodiment of a regulator stage 30 adapted to supply the modulation input of the modulator of FIG. 8.

FIG. 10 is a schematic diagram of a conventional regulator stage 30 of the control circuit of FIG. 3. It is formed essentially by a well-known circuit called differential amplifier having two inputs, the first of which receives an adjustable fraction of the voltage to be stabilized, formed, in the present case, by the output voltage VS of the power supply device (BS, FIG. 1) and the second input of which receives a stable reference voltage which is generally generated within this stage (as in most known ballast or switched-mode voltage regulator).

The reference voltage VZ is here produced by means of a Zener diode D7 (of the BZX83C type having a stabilized Zener voltage of 7.5 V) whose cathode is connected to the input 31 receiving the output voltage VS of the device BS (FIG. 1) and whose anode is connected through an eleventh resistor R11 (10 Kohms) to ground G. The second input of the differential amplifier used here is formed by the emitter of a fifth PNP transistor T4 which is connected to the anode of the Zener diode D7. The voltage (VS−VZ) biasing this emitter is then fixed with respect to the output voltage VS. The first input of the differential amplifier is here formed by the base of transistor T4 which is biased by a voltage-divider circuit, formed from a fifteenth resistor R15 (4.7 Kohms), a potentiometer R16 (5 Kohms) and a fourteenth resistor R14 (22 Kohms) connected in series between the input terminal 31 and ground G. The base of transistor T4, connected to the slider of potentiometer R16 receives then a previously adjusted fraction of the output voltage VS supplying the horizontal deflection circuit (SH), so that it forms a constant current generator supplying a current proportional to its emitter-base voltage which is equal to the difference (error voltage) between the reference voltage VZ and the selected fraction of the output voltage VS supplied by potentiometer R16. The collector of the fourth transistor T4, connected by a tenth resistor R10 (2.2 Kohms) to the output 32, supplies then the regulating current IR to the regulating input (12, FIGS. 3 and 8) of the pulse-width modulator (10 or 10B, FIGS. 3 and 8).

It will be noted here that a feedback circuit comprising a twelfth resistor R12 (5.6 Kohms) and a seventh capacitor C7 (4.7 nF) in series connects the collector of transistor 14 to its base.

The difference between the voltage respectively provided by the potentiometer R16 and the Zener diode D7 causes more or less heavy conduction of transistor T4 which delivers the current IR.

In short, when the output voltage VS increases, the voltage (VS−VZ) at the emitter of transistor T4 increases more than that applied to its base and current IR increases. The value of I1 at which transistor T3 is cut off increases then in absolute value and this transistor T3 is turned off later, which reduces the conducting period of transistor T1. The peak current in inductance L then diminishes, which causes a reduction of the output voltage VS which comes back to its nominal value, taking into account the residual error required for controlled operation.

Figure 11:
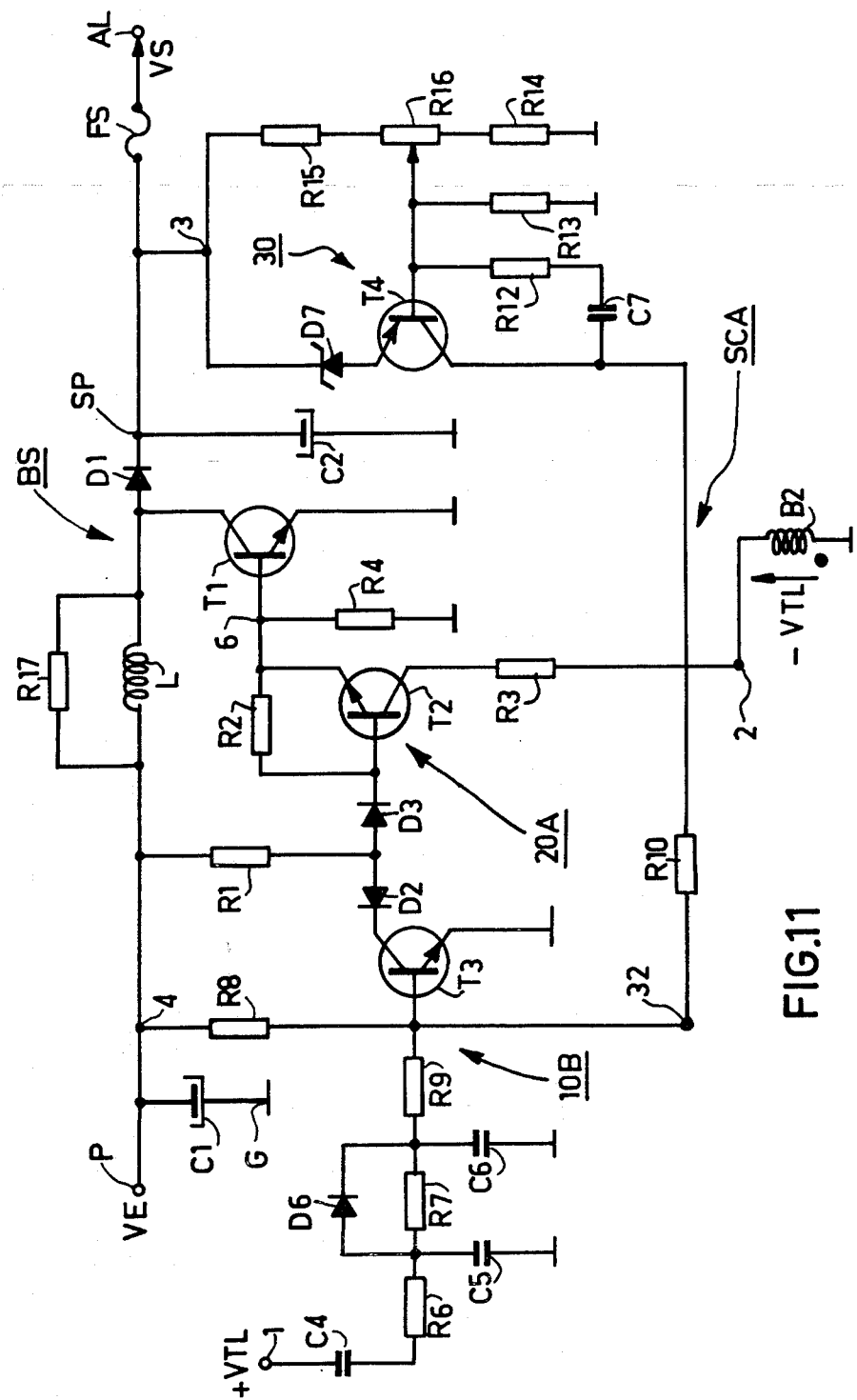
FIGS. 11 and 12 are partial respective schematic diagrams of two embodiments of a power supply device in accordance with the invention.

FIG. 11 shows the complete simplified diagram of a power supply device BS of FIG. 1 whose control circuit SCA is respectively formed by the driver circuit 20A of FIG. 4, by the modulator 10B of FIG. 8 and the regulator stage 30 of FIG. 10, except for a few variations.

The variations concern a damping resistor R17 of 1 kiloohm shunting the inductance L, resistor R8 and resistor R10 which are both connected directly to the base of transistor T3 instead of being connected to the cathode of diode D6, resistor R11 which has been omitted and a resistor R13 which shunts the slider of potentiometer R16 to ground. These details of construction have no influence at all on the operation of the circuit such as it has been described above, but simply allow easier adjustment.

Figure 12:
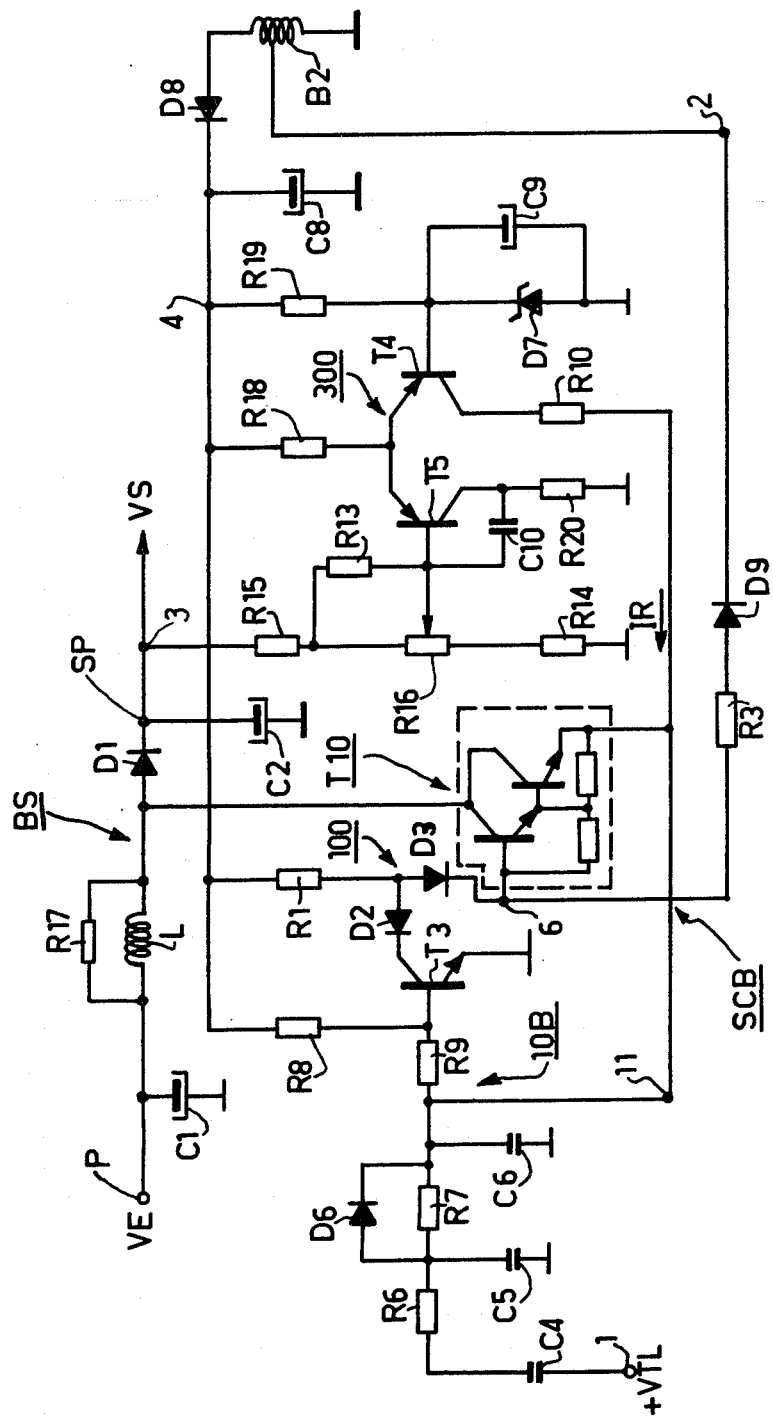

Another embodiment is shown in FIG. 12. It allows more especially a television set to be supplied with power in which the horizontal deflection circuit operates from a higher DC voltage VS, of about 100 volts for example, itself obtained from an initial output voltage VSI of about 60 volts. The operation of the circuit is fundamentally the same as that of FIG. 11 and only the differences will be described below. The components playing the same role in both diagrams bear the same references. The values may however be different but their dimensioning is within the scope of a man skilled in the art. The voltage VS delivered by the power supply is used principally in the horizontal deflection circuit which is the component consuming most power in the television set. The power supply circuit components receiving permanently a voltage when the horizontal deflection circuit is not operating, but when the mains is connected, are solely those indispensable for activating the power supply, i.e. the first switching transistor T1 and the circuit for measuring the output voltage in the regulator stage 300.

To simplify the driver stage 100, instead of the single switching transistor T1, an integrated Darlington circuit T10 is used of the BU 807 type, for example. Therefore, the gain is sufficient to omit a discrete driver transistor T2 and to connect the cathode of diode D3 directly to the base input of T10. The negative −VTH pulses, coming from an intermediate tapping on coil B2 of the line output transformer, are applied directly to the base of T10 through resistor R3 which is connected in series with a diode D9 whose cathode is connected to this intermediate tapping.

Instead of the input voltage VE, the power supply input 4 of the control circuit SCB is fed by a voltage obtained by rectifying the positive half-waves (plateaux) of the −VTL voltage supplied by the first secondary winding B2, by means of a diode D8 and a capacitor C8. Thus considerably lower voltage may be obtained than that supplying the horizontal deflection circuit, of the order of 13 volts, for example. A voltage of this value allows video amplification circuits as well as other circuits of the television set to be supplied while providing for these latter a very great reliability. This voltage is applied through resistor R1 to the anodes of diodes D2 and D3 and through resistor R8 to the base of the transistor T3 of modulator 10B.

The regulator stage 300 here comprises two PNP transistors T4 and T5 connected differentially. For that, their emitters receive the voltage rectified by D8 through a resistor R18 of 1.5 kiloohms. The collector of transistor T5 is connected to ground through a resistor R20 of 3.9 kiloohms and the collector of transistor T4, which supplies the regulating current IR, is connected to the cathode of diode D6 through a resistor R10 of 4.7 kiloohms.

The reference voltage (6.2 volts) is supplied by a Zener diode D7 whose anode is connected to ground, and cathode to a resistor R19 (6.8 kiloohms) which receives the voltage rectified by D8. This reference voltage is applied to the base of transistor 14. A capacitor C9 (49 microfarads) shunts diode D7 so as to cause the reference voltage to rise gradually when the apparatus is switched on, which allows a gradual rise of the output voltage VS to be obtained.

A potentiometer R16 of 10 kiloohms connected between two stopper resistors R15 (68 kiloohms) and R14 (5.6 kiloohms) receives the voltage VS through the resistor R15 and is connected to ground through resistor R14. The sliding contact of potentiometer R16 allows a fraction of the voltage VS to be applied to the base T5. A resistor R13 (47 kiloohms) also connects this base to the common point between R15 and R16.

An anti-oscillation capacitor C10 (15 nanofarads) connects the base of the collector of transistor T5.

Thus the regulating current IR supplied by resistor R10 is directly dependent on the difference between the output voltage VS, applied to the horizontal deflection circuit, and the reference voltage determined by the Zener diode D7. The power supply BS thus stabilizes this voltage VS and at the same time the rectified voltage supplied by diode D8.

To stop this power supply, as well as that of FIG. 11 moreover, it is sufficient to stop by means of a remote control receiver, for example, the operation of the horizontal oscillator.

In this case, the input voltage VE is still present, but is considerably smaller than voltage VS. For the power supply of FIG. 12, this reduced voltage is only applied to the Darlington transistor T10 and a fraction thereof to the base of transistor T5 of the regulator stage 300. Thus the life expectation of the other components of the device BS is increased. Since the voltage supplied by diode D8 is itself regulated, it may be used for supplying a major portion of the television set, except for the horizontal deflection circuit supplied by voltage VS and the remote control receiver which must be capable of operating permanently (also in the ready state) so as to detect the turn-on control signal. The protection which was mentioned earlier on is then extended to the greatest part of the components of the television set.

It will be noted here that the three stages 10, 20 and 30 of control circuit SC (see FIGS. 1 and 3) may be formed by means of circuits different from those described and shown and which are known per se, and that it is sufficient to have a secondary winding B2 (in addition to the very-high-voltage winding) of the line transformer TL, supplying negative line-flyback pulses which may be used for generating a decreasing or increasing sawtooth voltage waveform as well as for controlling the cutting off of the first switching transistor T1.

What is claimed is:

1. A power supply device with switching regulation and boosting of its DC output voltage, combined with a horizontal deflection circuit of a television receiver, supplied thereby and which comprises in cascade a horizontal oscillator, a driver stage and an output stage including a trace switch transistor and a line transformer, this device comprising an inductance and the collector-emitter path of a switching transistor connected in series between the poles of a DC input voltage source, a rectifying diode connected by its anode to the junction between the inductance and the collector of said switching transistor and by its cathode to one of the terminals of a filtering and storage capacitor whose other terminal is connected to the emitter of said transistor, so as to apply across its terminals an initial DC voltage slightly lower than said input voltage, when said switching transistor is turned off, and a regulated DC output voltage with a level higher than said input voltage, when said transistor is recurrently, alternately turned on and off, the level of said output voltage depending on the duty cycle of said switching transistor states, and a control circuit feeding the base of said switching transistor and including a regulator stage comparing an adjustable fraction of said output voltage to a fixed reference voltage and supplying a regulating current or voltage proportional to the difference between said compared voltages, a pulse-width modulator triggered by means of a recurrent signal and supplying a rectangular signal whose duty cycle varies as a function of said regulating current or voltage, another driver stage receiving the rectangular signal and controlling said switching transistor, the regulation and boosting of said output voltage being controlled by the initially independent starting up of the entire horizontal deflection circuit when supplied by said initial voltage from said power supply device as soon as a DC input voltage is applied thereto and which then delivers recurrent trigger pulses to said pulse-width modulator, one of the supply inputs of said other driver stage receiving directly a first voltage waveform whose positive alternations comprise constant-voltage plateau and whose negative alternations comprise negative-going horizontal flyback pulses provided by a first secondary winding of said line transformer, so as to control the turning off of said switching transistor substantially simultaneously with that of the trace switch transistor.

2. A power supply device as claimed in claim 1, wherein said other driver circuit comprises a third transistor whose emitter is connected to the base of said switching transistor and which is of the same type as the latter, whose collector is connected, through said supply input, to said first secondary winding of said line transformer to receive therefrom said first waveform and whose base is coupled to the output of said pulse-width modulator.

3. A power supply device as claimed in claim 2, wherein the collector of said third transistor is connected, through a resistor to the supply input and its emitter is connected, furthermore, to that of the switching transistor through another resistor so that the negative-going flyback pulses, applied to the collector of said third transistor, control the symmetric (reverse) saturation thereof so as to reversely bias the base-emitter junction of said switching transistor.

4. A power supply device as claimed in claim 2, wherein the collector of said third transistor is connected to said power supply input through a fourth diode conducting in the normal direction of its collector-emitter path, and wherein its emitter is further connected, on the one hand, through a resistor, to the emitter of the switching transistor and, on the other hand, through another resistor and a fifth diode conducting in the reverse direction to that of the base-emitter junction of the switching transistor, so as to transmit to the base thereof negative-going flyback pulses through a voltage divider formed by said two resistors in series.

5. A power supply device as claimed in claim 1, wherein said other driver circuit comprises a third transistor whose emitter is connected to the base of said switching transistor, whose collector is connected to that of this latter so as to form a so-called Darlington circuit and whose base coupled, moreover, to said pulse-width modulator is further connected, through a resistor and a diode in series, to said first secondary winding of said line transformer so as to control the simultaneous turn off of both transistors of said Darlington circuit by simultaneously reversely biasing their respective base-emitter junctions, connected in series, by means of negative-going flyback pulses.

6. A power supply device as claimed in any one of the preceding claims, wherein said pulse-width modulator, supplied at its input with a voltage waveform whose positive alternations comprise positive-going flyback pulses and whose negative alternations comprise constant negative-voltage plateaux, comprises a passive circuit which forms a simple integrator during positive alternations because one of its resistors is shunted by a diode and which is a cascaded double integrator during negative alternations of this waveform so as to deliver during the trace periods of the scan a linearly decreasing negative current which, added to the positive regulating current, supplies the base of a fourth comparator transistor, so that the turning off of this latter through equality of the negative and positive currents supplied to this base controls the beginnings of the saturation of said switching transistor in such a manner that the duration of this saturation varies inversely with variation of said output voltage.

7. A power supply device as claimed in claim 6, wherein said comparator transistor is biased, furthermore, at its base by means of a resistor which connects it to the positive pole of said input voltage source, so that it remains saturated in the absence of flyback pulses supplied by said horizontal deflection circuit so as to maintain the switching transistor in a cut off state.

8. A power supply device as claimed in any one of the preceding claims, wherein said control circuit, except for the regulator stage which is supplied by said output voltage, is supplied by said input voltage.

9. A power supply device as claimed in any one of the preceding claims 1 to 6, wherein said DC supply voltage of said control circuit, with the exception of one of the inputs of said regulator stage receiving said output voltage, is supplied by a secondary winding of said line transformer, through a rectifier circuit including a diode and a filtering capacitor.

* * * * *